(12) United States Patent
Tanno et al.

(10) Patent No.: US 11,014,318 B2
(45) Date of Patent: May 25, 2021

(54) PNEUMATIC TIRE AND METHOD FOR MANUFACTURING SAME

(71) Applicants: The Yokohama Rubber Co., LTD., Tokyo (JP); KURARAY FASTENING CO., LTD., Osaka (JP)

(72) Inventors: Atsushi Tanno, Hiratsuka (JP); Hayato Sakamoto, Hiratsuka (JP)

(73) Assignees: The Yokohama Rubber Co., LTD.; Kuraray Fastening Co., Ltd.

( * ) Notice: Subject to any disclaimer, the term of this patent is extended or adjusted under 35 U.S.C. 154(b) by 880 days.

(21) Appl. No.: 15/532,960

(22) PCT Filed: Sep. 16, 2015

(86) PCT No.: PCT/JP2015/076265
§ 371 (c)(1),
(2) Date: Jun. 2, 2017

(87) PCT Pub. No.: WO2016/088428
PCT Pub. Date: Jun. 9, 2016

(65) Prior Publication Data
US 2019/0001600 A1    Jan. 3, 2019

(30) Foreign Application Priority Data
Dec. 2, 2014  (JP) .............................. JP2014-244233

(51) Int. Cl.
*B60C 19/00* (2006.01)
*B29D 30/06* (2006.01)
(Continued)

(52) U.S. Cl.
CPC ..... *B29D 30/0681* (2013.01); *B29D 30/0061* (2013.01); *B29D 30/06* (2013.01);
(Continued)

(58) Field of Classification Search
CPC ................. B60C 19/002; B29D 2030/0072
See application file for complete search history.

(56) References Cited

U.S. PATENT DOCUMENTS

2008/0142150 A1   6/2008  Robert
2009/0159172 A1   6/2009  Tanno et al.
(Continued)

FOREIGN PATENT DOCUMENTS

EP    1 745 947     1/2007
JP    2006-044503   2/2006
(Continued)

OTHER PUBLICATIONS

International Search Report for International Application No. PCT/JP2015/076265 dated Nov. 24, 2015, 4 pages, Japan.

*Primary Examiner* — Justin R Fischer
(74) *Attorney, Agent, or Firm* — Thorpe North & Western

(57) ABSTRACT

Provided are a pneumatic tire where a band-shaped surface fastener extending in a tire circumferential direction is mounted on a tire inner surface, a cut portion composed of a group of a plurality of notches extending in a width direction of this surface fastener without traversing this surface fastener is formed in this surface fastener repetitively along the tire circumferential direction, the surface fastener is divided into a plurality of components by these notches, and the surface fastener is disposed on the tire inner surface in a state where the cut portion is stretched so the components are continuous in the tire circumferential direction.

17 Claims, 11 Drawing Sheets

(51) Int. Cl.
 B29D 30/00 (2006.01)
 *B60C 5/00* (2006.01)
(52) U.S. Cl.
 CPC ............ B60C 19/00 (2013.01); B60C 19/002 (2013.01); *B29D 2030/0072* (2013.01); *B60C 5/00* (2013.01)

(56) References Cited

U.S. PATENT DOCUMENTS

| | | | |
|---|---|---|---|
| 2012/0000588 A1* | 1/2012 | Tanno | B29D 30/0061 152/450 |
| 2012/0204383 A1 | 8/2012 | Wood et al. | |
| 2012/0330266 A1 | 12/2012 | Zonneveld et al. | |
| 2013/0248071 A1 | 9/2013 | Tanno et al. | |
| 2015/0306831 A1 | 10/2015 | Joza et al. | |
| 2016/0008181 A1 | 1/2016 | Wood et al. | |

FOREIGN PATENT DOCUMENTS

| | | |
|---|---|---|
| JP | 2009-154320 | 7/2009 |
| JP | 2014-506511 | 3/2014 |
| JP | 2014-097791 | 5/2014 |
| JP | 2014-111317 | 6/2014 |
| WO | WO 2006/100245 | 9/2006 |
| WO | WO 2012/112768 | 8/2012 |
| WO | WO 2014/088064 | 6/2014 |

\* cited by examiner

PNEUMATIC TIRE AND METHOD FOR MANUFACTURING SAME

TECHNICAL FIELD

The present technology relates to a pneumatic tire provided with a fastener for attaching, as necessary, an affixture such as a noise absorbing member or the like to a tire inside surface, and a method for manufacturing the same. More particularly, the present technology relates to a pneumatic tire where a surface fastener can be mounted on a tire inner surface during a tire molding process and the surface fastener falling off during the tire molding process can be prevented effectively, and a method for manufacturing the same.

BACKGROUND ART

Conventionally, pneumatic tires provided with surface fasteners on the tire inside surface in order to facilitate the attaching of affixtures such as noise absorbing members and the like have been proposed (e.g. see Japanese Unexamined Patent Application Publication No. 2006-44503A). In pneumatic tires, noise absorbing members are provided in a cavity portion in order to reduce resonance generated in the cavity portion; the abovementioned pneumatic tire with surface fastener allows for easy mounting and removal of accessories such as noise absorbing members as necessary.

In adopting such a surface fastener, the surface fastener can be attached to an inner surface of a vulcanized pneumatic tire, but in this situation, there is a disadvantage where a production efficiency of the tire is extremely unfavorable. Therefore, it is proposed to mount the surface fastener on the tire inner surface during a tire molding process (for example, see Japanese Unexamined Patent Application Publication No. 2009-154320A). More specifically, it is proposed to wrap a plurality of surface fasteners in a state of being separated from each other or a state of being separable from each other around a molding drum together with a rubber sheet, dispose these surface fasteners on an inner surface of a cylindrical carcass molded body, mold a green tire by inflating this carcass molded body into a toroidal shape and bonding this carcass molded body on an inner peripheral surface of a tread ring, and then vulcanize the green tire. While the surface fastener per se cannot stretch when the carcass molded body deforms into the toroidal shape, by having the plurality of surface fasteners dotting a tire circumferential direction, the surface fastener can be mounted on the tire inner surface during the tire molding process.

However, with a method such as described above, while it is possible to mount the surface fastener on the tire inner surface during the tire molding process, a dimension of each surface fastener dotting the tire circumferential direction necessarily decreases; therefore, in a situation where the surface fastener is lifted from the tire inner surface in the course of inflating the carcass molding body to vulcanizing the green tire, there is a problem where the surface fastener falls off without meeting resistance.

SUMMARY

The present technology provides a pneumatic tire where a surface fastener can be mounted on a tire inner surface during a tire molding process and the surface fastener falling off during the tire molding process can be prevented effectively and a manufacturing method thereof.

With a pneumatic tire of the present technology, a band-shaped surface fastener extending in a tire circumferential direction is mounted on a tire inner surface, a cut portion composed of a group of a plurality of notches extending in a width direction of this surface fastener without traversing this surface fastener is formed in this surface fastener repetitively along the tire circumferential direction, the surface fastener is divided into a plurality of components by the notches, and the surface fastener is disposed on the tire inner surface in a state where the cut portion is stretched so the components are continuous in the tire circumferential direction.

Furthermore, a manufacturing method of a pneumatic tire of the present technology forms, in a band-shaped surface fastener, a cut portion repetitively along a longitudinal direction thereof composed of a group of a plurality of notches extending in a width direction of this surface fastener without traversing this surface fastener, divides the surface fastener into a plurality of components by the notches, disposes the surface fastener on an inner surface of a cylindrical carcass molded body so the longitudinal direction of the surface fastener extends in a tire circumferential direction, molds a green tire by inflating this carcass molded body into a toroidal shape and bonding this carcass molded body on an inner peripheral surface of a tread ring, places the surface fastener in a state where the cut portion is stretched so the components are continuous in the tire circumferential direction during this molding process of the green tire, and then vulcanizes the green tire.

Furthermore, a surface fastener of the present technology is a band-shaped surface fastener mounted on a tire inner surface to extend in a tire circumferential direction that is provided with a cut portion repetitively along the tire circumferential direction composed of a group of a plurality of notches formed to extend in a width direction of this surface fastener without traversing this surface fastener, includes a plurality of components divided by the notches, and is used in a state where the cut portion is stretched so these components are continuous in the tire circumferential direction.

In the present technology, because a structure is adopted where the cut portion composed of the group of the plurality of notches is formed in the surface fastener repetitively along the tire circumferential direction, the surface fastener is divided into the plurality of components by these notches, and the surface fastener is disposed on the tire inner surface in the state where the cut portion is stretched so the components are continuous in the tire circumferential direction, the surface fastener can be mounted on the tire inner surface during the tire molding process based on a manufacturing method such as described above. Therefore, the pneumatic tire provided with the surface fastener can be manufactured efficiently.

Furthermore, because the notch formed in the surface fastener extends in the width direction of the surface fastener without traversing the surface fastener and the surface fastener is disposed on the tire inner surface in the state where the plurality of components is continuous in the tire circumferential direction, even if a component of a portion were to be peeled off of the tire inner surface, this component would be held on the tire inner surface by the other components. Therefore, the surface fastener falling off during the tire molding process can be prevented effectively.

In the present technology, a length of the notch in the state where the cut portion is stretched is preferably no less than 20% of a width of the surface fastener. By sufficiently ensuring the length of the notch, stretching of the surface fastener during the tire molding process can be allowed. Particularly, the length of at least one notch included in each cut portion is preferably no less than 50% of the width of the surface fastener. In this situation, a distortion arising in each component when the surface fastener is stretched during the tire molding process can be suppressed and adhesion failure of the surface fastener can be prevented. Moreover, to allow stretching of the surface fastener to be smooth, it is preferable for at least one notch included in each cut portion to be communicated to one end portion in the width direction of the surface fastener and at least one other notch to be communicated to another end portion in the width direction of the surface fastener.

A period in the tire circumferential direction of the cut portion in the state where this cut portion is stretched is preferably 15% to 150% of the width of the surface fastener. By this, an arrangement of carcass cords or the like becoming uneven on a tire circumference due to the surface fastener during the tire molding process can be prevented.

An area of a region surrounded by an outline of the surface fastener in the state where the cut portion is stretched is preferably 105% to 190% of an actual area of the surface fastener. Moreover, a length in the tire circumferential direction of the surface fastener in the state where the cut portion is stretched is preferably 105% to 190% of a total length in the tire circumferential direction of the components of the surface fastener. By this, a stretch rate of the surface fastener during the tire molding process can be optimized and adhesion failure arising in the surface fastener can be prevented.

Furthermore, a width of each component of the surface fastener is preferably 3% to 25% of the width of the surface fastener. By this, a distortion arising in each component when the surface fastener is stretched during the tire molding process can be suppressed and adhesion failure of the surface fastener can be prevented.

The components of the surface fastener preferably include a plurality of first components configuring a main locking portion without deforming when the cut portion is stretched and a plurality of second components that deforms when the cut portion is stretched and links the first components to each other. In this situation, the first component plays a role of the main locking portion and the second portion functions as a deforming portion at the time of stretching. Particularly, in a situation where a width of the first component is made greater than a width of the second component, an engaging performance of the first component can be increased while decreasing the distortion arising in the second component. To form the first component and the second component, a configuration is preferable where the notches nearest to each other in a pair of adjacent cut portions are communicated to an end portion on the same side in the width direction of the surface fastener.

In the pneumatic tire of the present technology, it is preferable to dispose an adhesive rubber layer between the surface fastener and the tire inner surface; for the surface fastener to be provided with a sheet-shaped substrate, a plurality of engaging elements formed on one surface of this substrate, and a plurality of anchor elements formed on another surface of this substrate; and to have the anchor element dig into the adhesive rubber layer. To realize such a configuration, in the manufacturing method of a pneumatic tire of the present technology, it is preferable to dispose the adhesive rubber layer between the surface fastener and the carcass molded body; for the surface fastener to be provided with the sheet-shaped substrate, the plurality of engaging elements formed on the one surface of this substrate, and the plurality of anchor elements formed on the other surface of this substrate; and to have the anchor element dig into the adhesive rubber layer. In this situation, the surface fastener can be fixed firmly on the tire inner surface.

In the pneumatic tire of the present technology, it is preferable to dispose the adhesive rubber layer between the surface fastener and the tire inner surface, provide the cut portion in the surface fastener, and have the adhesive rubber layer extend continuously in the tire circumferential direction without being cut off at the cut portion. To realize such a configuration, in the manufacturing method of a pneumatic tire of the present technology, it is preferable to stack the surface fastener without the cut portion and the adhesive rubber layer, form the cut portion by cutting only the surface fastener stacked with this adhesive rubber layer, and dispose this surface fastener formed with the cut portion on the inner surface of the carcass molded body together with the adhesive rubber layer. By this, an integrity of the adhesive rubber layer can be ensured and a shape stability as a member of the adhesive rubber layer before being wrapped around a molding drum can be ensured.

Furthermore, in the manufacturing method of a pneumatic tire of the present technology, it is preferable to engage the surface fastener without the cut portion and an element protection member with each other, form the cut portion by simultaneously cutting the surface fastener without the cut portion and the element protection member, mold the green tire by disposing this surface fastener formed with the cut portion on the inner surface of the carcass molded body together with the element protection member, and peel off the element protection member from the surface fastener after vulcanizing this green tire. In this situation, because the surface fastener can be protected by the element protection member during the vulcanization process and the element protection member comes to have a structure of being linked continuously similarly to the surface fastener, a peeling operation of the element protection member can be performed easily.

BRIEF DESCRIPTION OF DRAWINGS

FIG. 5A is a plan view of a state before stretching, and FIG. 5B is a plan view of a state after stretching.

FIG. 6A is a cross-sectional view schematically illustrating a molding process of a carcass molded body, FIG. 6B is a cross-sectional view schematically illustrating a molding process of a green tire, and FIG. 6C is a cross-sectional view schematically illustrating the obtained green tire.

FIG. 7A is a plan view of a state before stretching, and FIG. 7B is a plan view of a state after stretching.

8A is a plan view of a state before stretching, and FIG. 8B is a plan view of a state after stretching.

FIG. 9A is a plan view of a state before stretching, and FIG. 9B is a plan view of a state after stretching.

FIG. 10A is a plan view of a state before stretching, and FIG. 10B is a plan view of a state after stretching.

FIG. 11A is a plan view of a state before stretching, FIG. 11B is a plan view of a state after stretching, and FIG. 11C is a plan view of a state after vulcanization.

FIG. 12A is a plan view of a state before stretching, FIG. 12B is a plan view of a state after stretching, and FIG. 12C is a plan view of a state after vulcanization.

DETAILED DESCRIPTION

Figure 1:
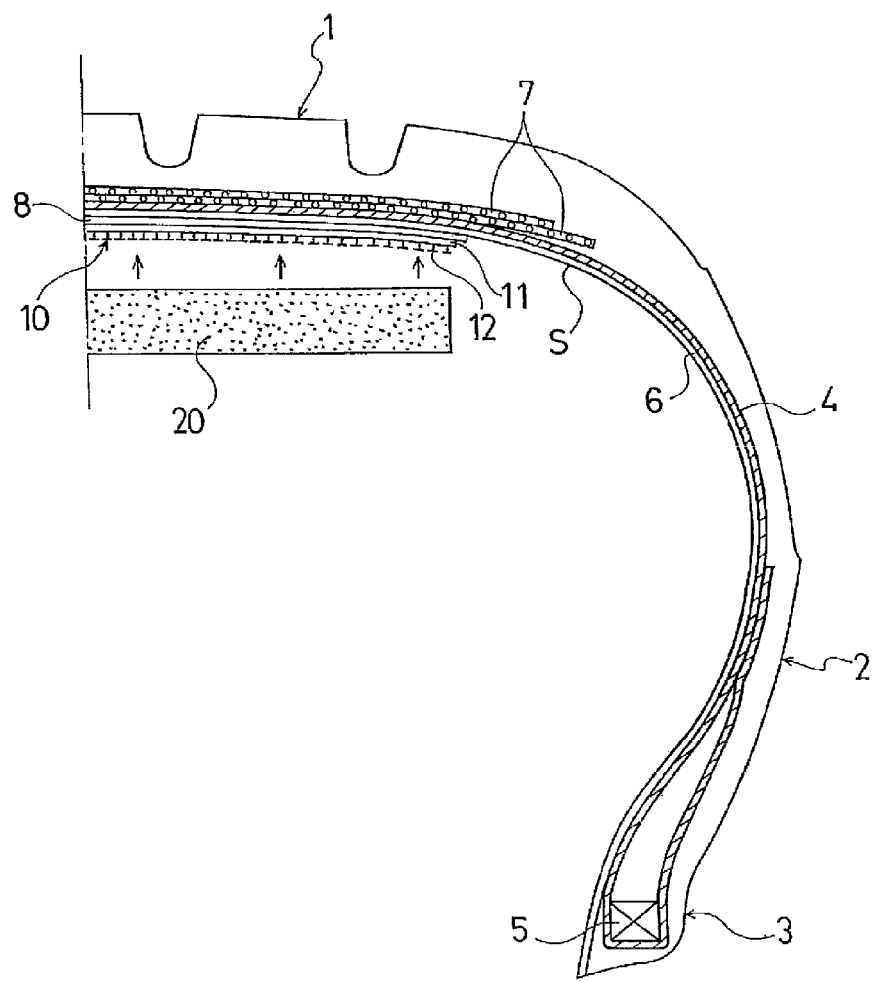
FIG. 1 is a meridian cross-sectional view illustrating the pneumatic tire according to an embodiment of the present technology.
Figure 2:
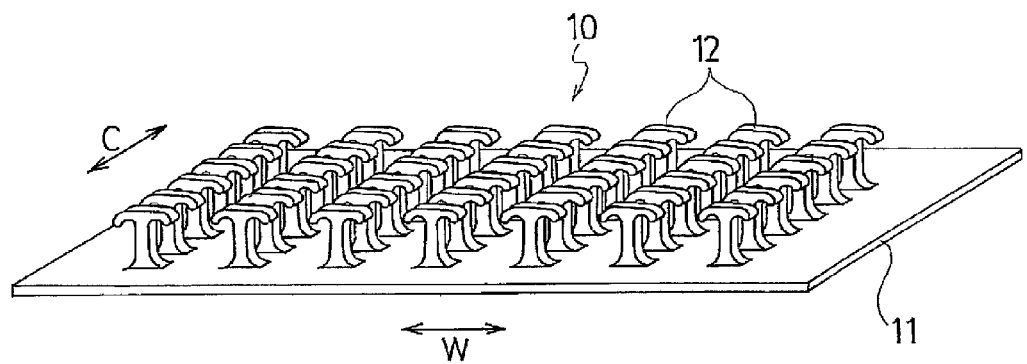
FIG. 2 is a perspective view illustrating an example of a fastener used in the present technology.

A configuration of the present technology will be described below in detail with reference to the accompanying drawings. FIGS. 1 and 2 illustrate a pneumatic tire formed according to an embodiment of the present technology, and FIGS. 3 to 5B illustrate a fastener used in the present technology.

In FIG. 1, 1 is a tread portion; 2 is a side wall portion; and 3 is a bead portion. The carcass layer 4 is mounted between the left-right pair of bead portions 3, 3. The carcass layer 4 is wrapped back around a bead core 5 disposed in each of the bead portions 3 from the inside of the tire to the outside of the tire. Moreover, an inner liner layer 6 is disposed in an area on a tire-cavity side of the carcass layer 4. Meanwhile, a plurality of belt layers 8 is embedded to an outer circumferential side of the carcass layer 4 in the tread portion 1.

In the pneumatic tire above, a surface fastener 10 is disposed via an adhesive rubber layer 8 in a region corresponding to the tread portion 1 of a tire inner surface S. As illustrated in FIG. 2, the surface fastener 10 is provided with a substrate 11 forming a sheet shape and a plurality of engaging elements 12 formed on one surface of this substrate 11. The engaging elements 12 form columns along a tire circumferential direction C and are disposed so a plurality of columns lines up along a tire width direction W. While a shape of the engaging element 12 is not particularly limited, it is sufficient that, for example, a T shape or an arrow shape (including a double-arrow shape) where, as illustrated, a tip portion branches in two and extends in a surface direction of the surface fastener 10. The surface fastener 10 configured in this manner has the substrate 11 vulcanized and adhered on the tire inner surface S so the engaging element 12 is positioned on a tire-cavity side.

Meanwhile, an affixture such as a noise-absorbing member 20 is installed to the surface fastener 10 as necessary. For example, with a noise-absorbing member 20 composed of polyurethane foam, the noise-absorbing member 20 can be engaged as is with the surface fastener 10 by utilizing a mesh structure of this polyurethane foam. Of course, another surface fastener that can engage with the surface fastener 10 may be installed to the affixture. Examples of the affixture 20 other than noise absorbing members include temperature sensors, transponders, and the like. Moreover, a disposition location of the surface fastener 10 on the tire inner surface S can be selected freely according to the type of affixture.

Figure 3:
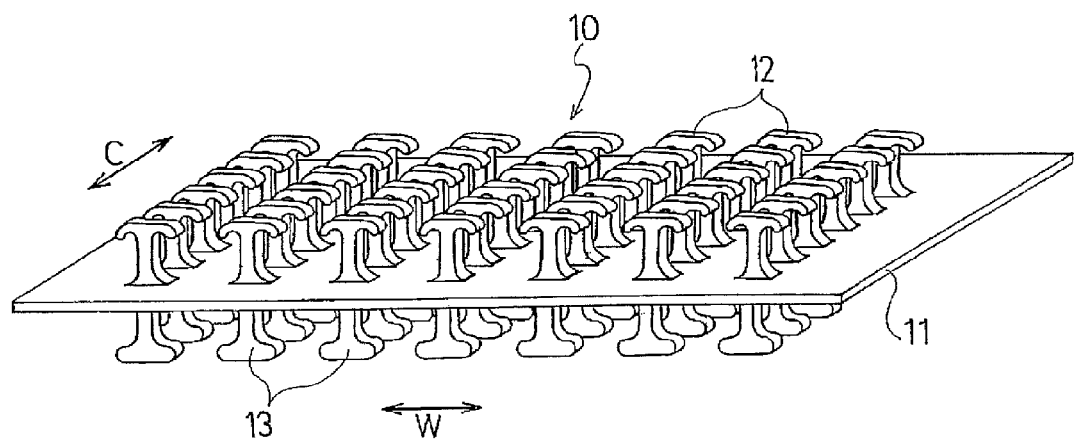
FIG. 3 is a perspective view illustrating a second fastener used in the present technology.
Figure 4:
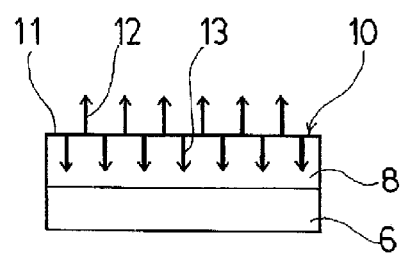
FIG. 4 is a cross-sectional view illustrating the fastener in FIG. 3 mounted on a tire inner surface.

FIG. 3 illustrate other fasteners used in the present technology. In FIG. 3, the surface fastener 10 is provided with the substrate 11 forming the sheet shape, the plurality of engaging elements 12 formed on the one surface of this substrate 11, and a plurality of anchor elements 13 formed on another surface of this substrate 11. The anchor elements 13 form columns along the tire circumferential direction C and are disposed so a plurality of columns lines up along the tire width direction W. While a shape of the anchor element 13 is not particularly limited, it is sufficient that, for example, a T shape where, as illustrated, a tip portion branches in two and extends in the surface direction of the surface fastener 10. As illustrated in FIG. 4, because these anchor elements 13 are embedded in the adhesive rubber layer 8 stacked with the inner liner layer 6, an adhesive force of the surface fastener 10 on the tire inner surface S can be improved.

The surface fastener 10 described above can be molded from a thermoplastic resin such as nylon, polyester, polyethylene, polypropylene, polyvinyl chloride, polystyrene, acrylonitrile/styrene, acrylonitrile/butadiene/styrene, or polyethylene terephthalate. Particularly, a resin whose main ingredient is a polyamide or a polyester is preferable.

Figure 5A:
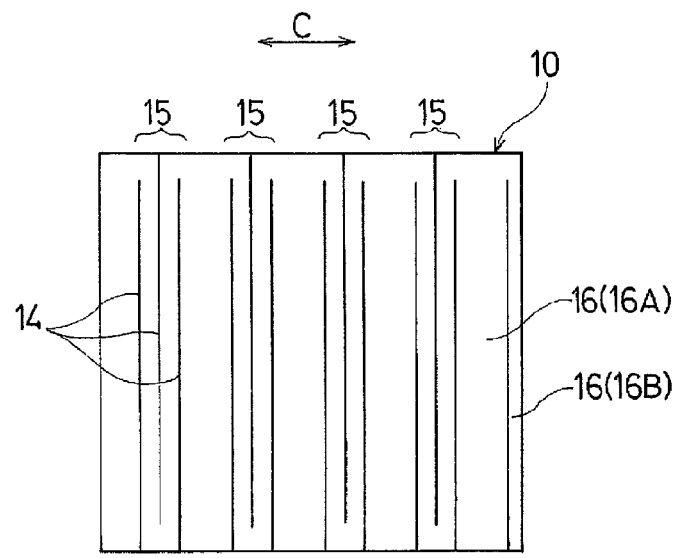
FIGS. 5A and 5B illustrate a plan-view structure of the surface fastener used in the present technology.
Figure 5B:
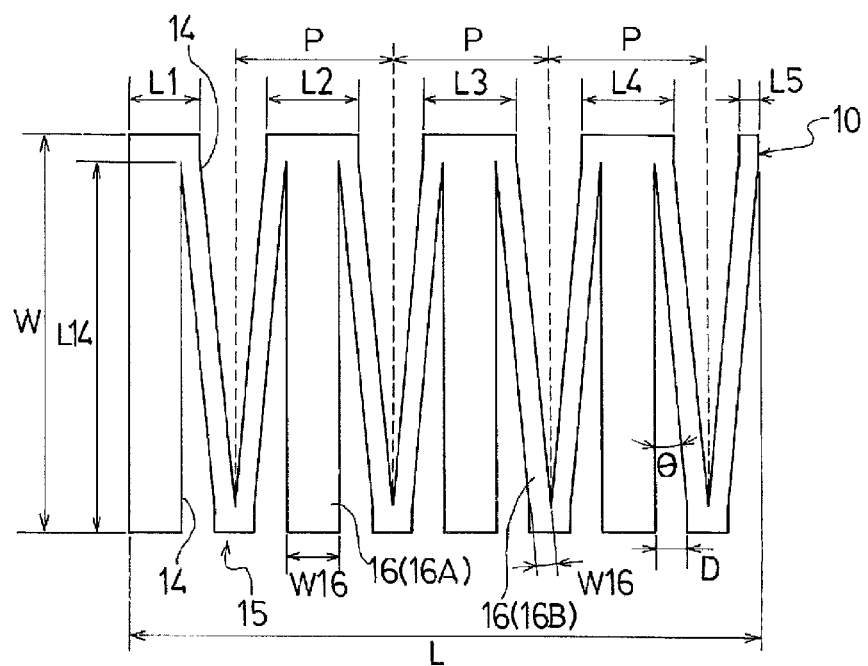

FIGS. 5A and 5B illustrate other fasteners used in the present technology. As illustrated in FIG. 5A, a cut portion 15 composed of a group of a plurality of notches 14 is formed in the band-shaped surface fastener 10 repetitively along a longitudinal direction of the surface fastener 10. Each notch 14 extends in a width direction of the surface fastener 10 without traversing the surface fastener 10. Moreover, the plurality of notches 14 is disposed in each cut portion 15 extending continuously over an entirety of the width direction of the surface fastener 10. Particularly, at least one notch 14 included in each cut portion 15 is communicated with one end portion in the width direction of the surface fastener 10 and at least one other notch 14 is communicated with another end portion in the width direction of the surface fastener 10. By this, the surface fastener 10 is divided by the notches 14 into a plurality of components 16 forming a strip shape. However, because the plurality of components 16 is linked to each other, the surface fastener 10 maintains an overall integrity. The surface fastener 10 having such a plurality of cut portions 15 is used so the longitudinal direction of the surface fastener 10 extends in the tire circumferential direction C and, as illustrated in FIG. 5B, is disposed on the tire inner surface S in a state where the cut portion 15 is stretched so the components 16 thereof are continuous in the tire circumferential direction C.

Figure 6A:
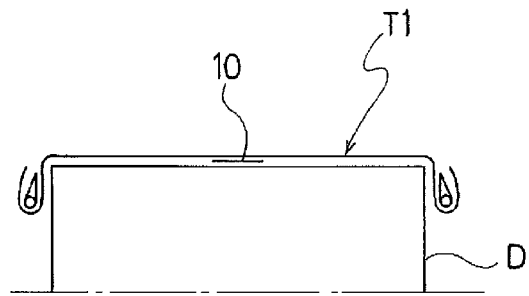
FIGS. 6A to 6C illustrate a manufacturing method of a pneumatic tire according to the present technology.
Figure 6B:
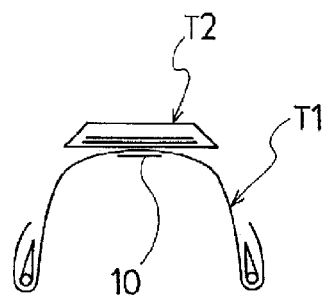
Figure 6C:
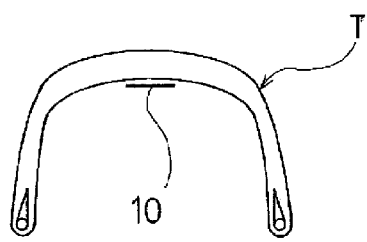

FIGS. 6A to 6C illustrate a method for manufacturing the pneumatic tire of the present technology. In a situation of manufacturing a pneumatic tire such as described above, first, as illustrated in FIG. 6A, in molding a cylindrical carcass molded body T1 on a molding drum D, the surface fastener 10 having the cut portion 15 described above is disposed on an inner surface of the cylindrical carcass molded body T1 so the longitudinal direction of the surface fastener 10 extends in the tire circumferential direction C. At this time, the surface fastener 10 is in a state where the cut portion 15 is closed. Note that a single surface fastener 10 may be disposed on a tire circumference or a plurality of surface fasteners 10 may be disposed lined up on the tire circumference.

Next, as illustrated in FIG. 6B, the carcass molded body T1 is disposed on an inner peripheral side of an annular tread ring T2 and the carcass molded body T1 is inflated into a toroidal shape and bonded on the inner peripheral surface of the tread ring T2. By this, as illustrated in FIG. 6C, a green tire T is molded that is provided with the surface fastener 10 on the tire inner surface S. In the green tire T, the surface fastener 10 is in a state where the cut portion 15 is stretched so the components 16 are continuous in the tire circumferential direction C. Afterward, the green tire T is vulcanized in a mold.

In the embodiment described above, because a structure is adopted where the cut portion 15 composed of the group of the plurality of notches 14 is formed in the surface fastener 10 repetitively in the tire circumferential direction, the surface fastener 10 is divided into the plurality of components 16 by these notches 14, and the surface fastener 10 is disposed on the tire inner surface S in the state where the cut portion 15 is stretched so the components 16 are continuous in the tire circumferential direction C, the surface fastener 10 can be mounted on the tire inner surface S in the tire molding process based on a manufacturing method such as described above. Therefore, a pneumatic tire provided with the surface fastener 10 can be manufactured efficiently.

Furthermore, because the notch 14 formed in the surface fastener 10 extends in the width direction thereof without traversing the surface fastener 10 and the surface fastener 10 is disposed on the tire inner surface S in the state where the plurality of components 16 is continuous in the tire circumferential direction C, even if the component 16 of one portion were to be peeled off of the tire inner surface S, this component 16 would be held on the tire inner surface S by the other components 16. Therefore, the surface fastener 10 falling off during the tire molding process can be prevented effectively.

Here, a length L14 of the notch 14 in the state where the cut portion 15 is stretched is no less than 20%, preferably no less than 35%, and more preferably no less than 45% of a width W of the surface fastener 10; it is sufficient that an upper limit thereof is 98%. By sufficiently ensuring the length L14 of the notch 14, a stretch rate of the surface fastener 10 during the tire molding process can be sufficiently ensured. When the length L14 of the notch 14 is smaller than the lower limit, stretching of the surface fastener 10 becomes insufficient; conversely, when this is greater than the upper limit, the surface fastener 10 may break in the tire circumferential direction during the tire molding process.

Particularly, it is sufficient for the length L14 of at least one notch 14 included in each cut portion 15 to be no less than 50% and more preferably no less than 70% of the width W of the surface fastener 10. That is, when an opening angle between the components 16, 16 is defined as $\theta$, a gap D between the components 16, 16 arising due to stretching of the cut portion 15 satisfies a relationship of $D=L14\times\tan\theta$. Because of this, in a situation where the length L14 of the notch 14 is relatively increased, the gap D between the components 16, 16 can be increased while decreasing the opening angle $\theta$ between the components 16, 16. By this, distortion arising in each component 16 when the surface fastener 10 stretches during the tire molding process can be suppressed and adhesion failure of the surface fastener 10 can be prevented.

It is sufficient that a period P in the tire circumferential direction of the cut portion 15 in the state where this cut portion 15 is stretched is 15% to 150% of the width W of the surface fastener 10. By this, an arrangement of carcass cords or the like becoming uneven on the tire circumference due to a rigid surface fastener 10 during the tire molding process can be prevented. When the period P of the cut portion 15 is smaller than the lower limit, a shape of the cut portion 15 may become complex and an engaging function of the surface fastener 10 may be impaired; conversely, when this is greater than the upper limit, unevenness on the tire circumference decreases. Note that it is desirable for the period P of the cut portion 15 to be constant on the tire circumference but a slight fluctuation is unproblematic.

It is sufficient that an area of a region surrounded by an outline of the surface fastener 10 in the state where the cut portion 15 is stretched is 105% to 190% and preferably 120% to 170% of an actual area of the surface fastener 10. By this, the stretch rate of the surface fastener 10 during the tire molding process can be optimized and adhesion failure arising in the surface fastener 10 can be prevented. When the area of the region surrounded by the outline of the surface fastener 10 is smaller than the lower limit, a material efficiency of the surface fastener 10 becomes unfavorable; conversely, when this is greater than the upper limit, out-of-plane deformation arises more easily in the component 16 of the surface fastener 10 and this out-of-plane deformation becomes a cause of adhesion failure. Note that the area of the region surrounded by the outline of the surface fastener 10 in the state where the cut portion 15 is stretched is the product of the width W of the surface fastener 10 in the state where the cut portion 15 is stretched and the length L in the tire circumferential direction of the surface fastener 10 in the state where the cut portion 15 is stretched.

Furthermore, it is sufficient that the length L in the tire circumferential direction of the surface fastener 10 in the state where the cut portion 15 is stretched is 105% to 190% and preferably 120% to 170% of a total length Lt in the tire circumferential direction of the component 16 of the surface fastener 10. By this, the stretch rate of the surface fastener 10 during the tire molding process can be optimized and adhesion failure arising in the surface fastener 10 can be prevented. When the length L in the tire circumferential direction of the surface fastener 10 is smaller than the lower limit, the material efficiency of the surface fastener becomes unfavorable; conversely, when this is greater than the upper limit, out-of-plane deformation arises more easily in the component 16 of the surface fastener 10 and this out-of-plane deformation becomes a cause of adhesion failure. Note that as illustrated in FIG. 5B, the total length Lt in the tire circumferential direction of the component 16 of the surface fastener 10 is a total of lengths L1, L2, L3, L4, and L5 in the tire circumferential direction of each portion divided by the surface fastener 10 (L=L1+L2+L3+L4+L5)—that is, it corresponds to a length in the tire circumferential direction of the surface fastener 10 before stretching.

Furthermore, it is sufficient for a width W16 of each component 16 of the surface fastener 10 to be 3% to 25% and preferably 3.5% to 20% of the width W of the surface fastener 10. By this, distortion arising in each component 16 when the surface fastener 10 stretches during the tire molding process can be suppressed and adhesion failure of the surface fastener 10 can be prevented. When the width W16 of each component 16 is smaller than the lower limit, the engagement function of the surface fastener 10 may be impaired; conversely, when this is greater than the upper limit, out-of-plane deformation arises more easily in the component 16 of the surface fastener 10 and this out-of-plane deformation becomes a cause of adhesion failure. For example, it is sufficient to set the width W of the surface fastener 10 to a range of 45 mm to 50 mm and set the width W16 of each component 16 to a range of 2 mm to 15 mm.

As illustrated in FIG. 5B, the component 16 of the surface fastener 10 preferably includes a plurality of first components 16A configuring a main locking portion without deforming when the cut portion 15 is stretched and a plurality of second components 16B that deforms when the cut portion 15 is stretched and links the first components to each other. More specifically, one end of the first component 16A is linked to the second component 16B adjacent thereto and another end is a free end. Meanwhile, both ends of the second component are linked to the first component 16A or the second component 16B adjacent thereto. In forming the first component 16A and the second component 16B, a configuration is favorable where the notches 14, 14 nearest to each other in a pair of adjacent cut portions 15, 15 are communicated to an end portion on the same side in the width direction of the surface fastener 10. Particularly, it is sufficient to make the lengths L14 of the notches 14, 14 nearest to each other in the pair of adjacent cut portions 15, 15 the same. In a situation where the first component 16A and the second component 16B are mixed in this manner, the first component 16A plays a role of the main locking portion and the second component 16B functions as a deforming portion at the time of stretching. Particularly, in a situation where the width W16 of the first component 16A is made greater than the width W16 of the second component 16, an engaging performance of the first component 16A can be increased while decreasing the distortion arising in the second component 16B. When the surface fastener 10 stretches in the tire circumferential direction, because an orientation of the engaging element 12 does not change at the first component 16A, an engagement force based on the engaging element 12 can be exhibited maximally.

Figure 7A:
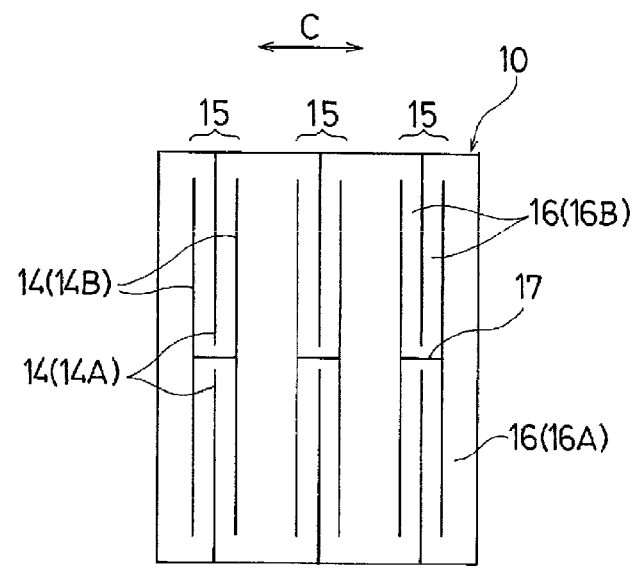
FIGS. 7A and 7B illustrate a plan-view structure of another surface fastener used in the present technology.
Figure 7B:
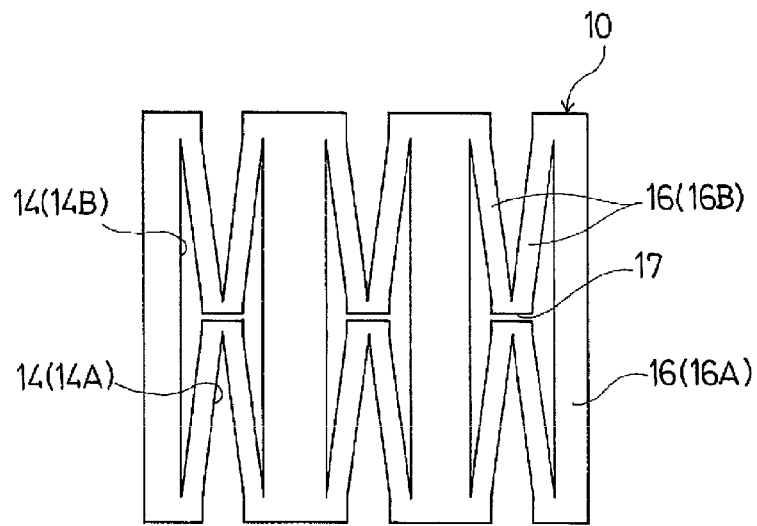

FIGS. 7A and 7B illustrate other fasteners used in the present technology. As illustrated in FIG. 7A, the cut portion 15 composed of the group of the plurality of notches 14 extending in the width direction of the surface fastener 10 without traversing the surface fastener 10 is formed in the band-shaped surface fastener 10 repetitively along the longitudinal direction of the surface fastener 10. In this example, in each cut portion 15, the notches 14 include a pair of notches 14A extending from both sides in the width direction of the surface fastener 10 and a pair of notches 14B that is disposed on both sides of this pair of notches 14A and has both ends closed. Moreover, a notch 17 is formed that extends in the longitudinal direction of the surface fastener to link the pair of notches 14B, 14B. In this situation, as illustrated in FIG. 7B, in the state where the surface fastener 10 is stretched the component 16B divided by the notch 17 moves to a width-direction outer side of the surface fastener 10 as it deforms.

Figure 8A:
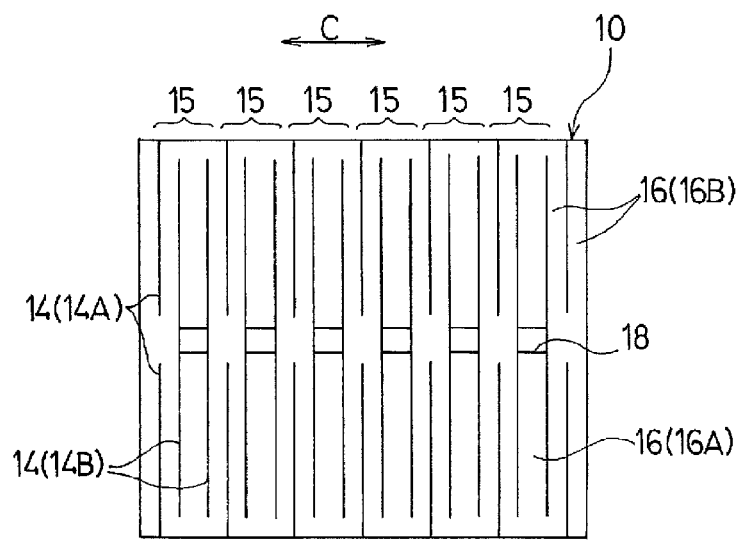
FIGS. 8A and 8B illustrate a plan-view structure of still another surface fastener used in the present technology. FIG.
Figure 8B:
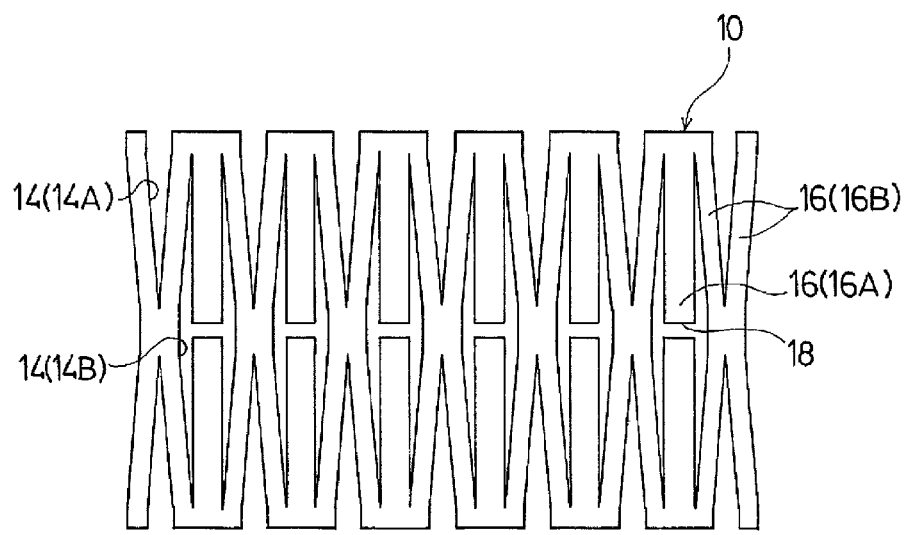

FIGS. 8A and 8B illustrate a plan-view structure of still another surface fastener used in the present technology. As illustrated in FIG. 8A, the cut portion 15 composed of the group of the plurality of notches 14 extending in the width direction of the surface fastener 10 without traversing the surface fastener 10 is formed in the band-shaped surface fastener 10 repetitively along the longitudinal direction of the surface fastener 10. In this example, in each cut portion 15, the notches 14 include the pair of notches 14A extending from both sides in the width direction of the surface fastener 10 and the pair of notches 14B that is disposed on one side of this pair of notches 14A and has both ends closed. Moreover, a notch (slit) 18 is formed that extends in the longitudinal direction of the surface fastener 10 to link the pair of notches 14B, 14B. In this situation, as illustrated in FIG. 8B, in the state where the surface fastener 10 is stretched, the component 16A divided by the notch 18 moves to a width-direction inner side of the surface fastener 10 as the component 16B deforms.

Figure 9A:
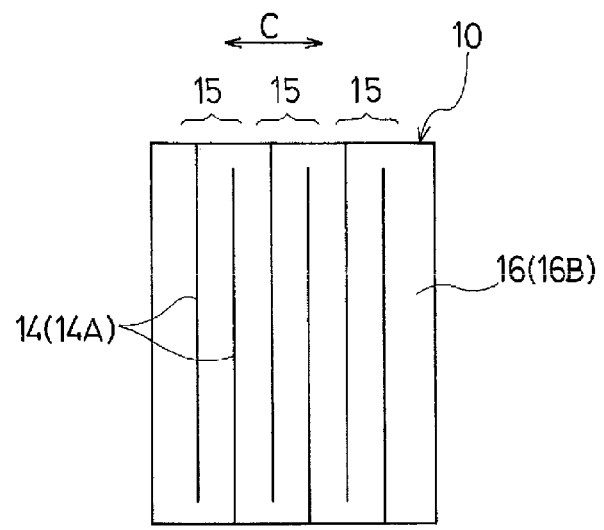
FIGS. 9A and 9B illustrate a plan-view structure of still another surface fastener used in the present technology.
Figure 9B:
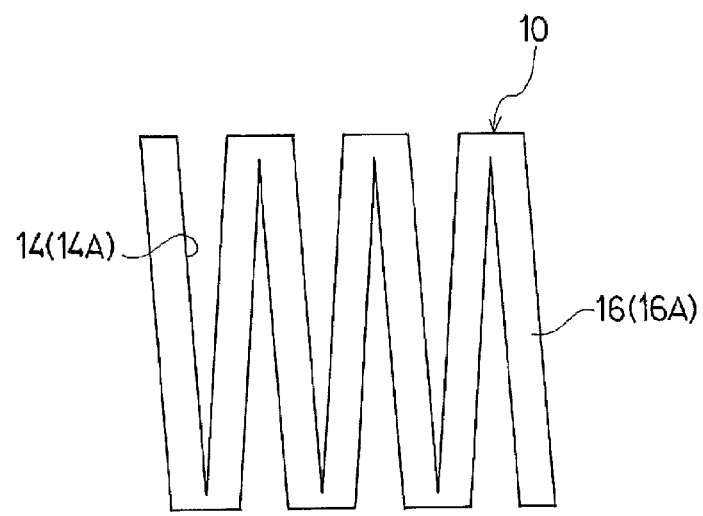

FIGS. 9A and 9B illustrate a plan-view structure of still another surface fastener used in the present technology. As illustrated in FIG. 9A, the cut portion 15 composed of the group of the plurality of notches 14 extending in the width direction of the surface fastener 10 without traversing the surface fastener 10 is formed in the band-shaped surface fastener 10 repetitively along the longitudinal direction of the surface fastener 10. In this example, in each cut portion 15, the notches 14 include only the pair of notches 14A extending from both sides in the width direction of the surface fastener 10.

Figure 10A:
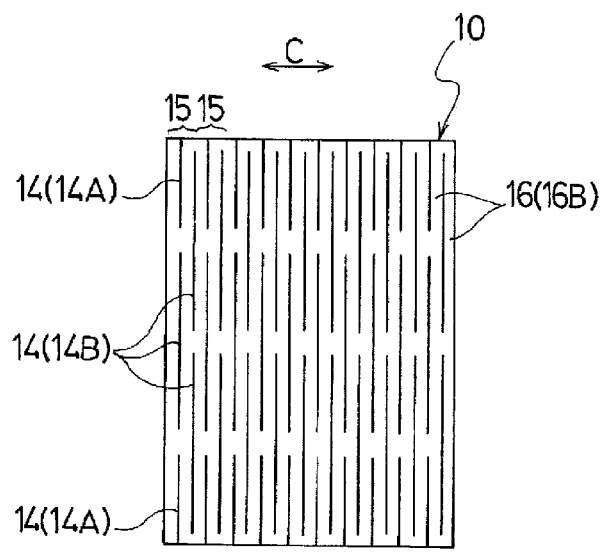
FIGS. 10A and 10B illustrate a plan-view structure of still another surface fastener used in the present technology.
Figure 10B:
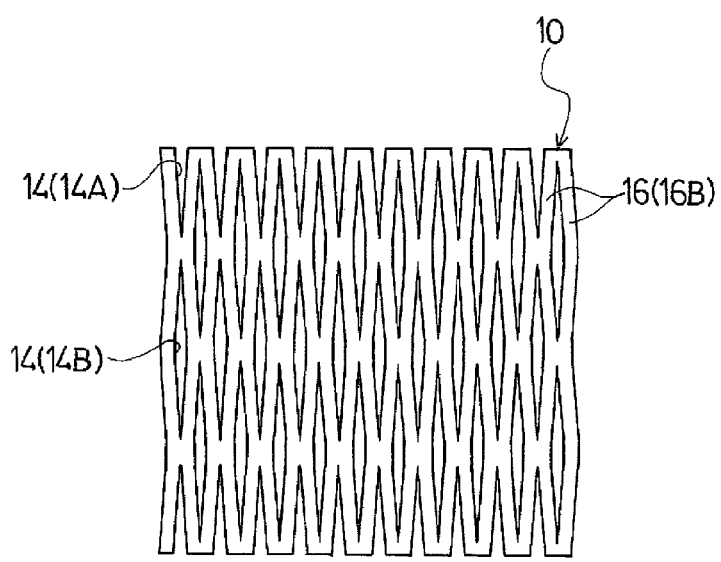

FIGS. 10A and 10B illustrate a plan-view structure of still another surface fastener used in the present technology. As illustrated in FIG. 10A, the cut portion 15 composed of the group of the plurality of notches 14 extending in the width direction of the surface fastener 10 without traversing the surface fastener 10 is formed in the band-shaped surface fastener 10 repetitively along the longitudinal direction of the surface fastener 10. In this example, in each cut portion 15, the notches 14 include the pair of notches 14A extending from both sides in the width direction of the surface fastener 10, one notch 14B that is disposed between the pair of notches 14A and has both ends closed, and two notches 14B that are disposed on one side of the pair of notches 14A and has both ends closed.

In the pneumatic tire described above, it is desirable to adopt a structure where the adhesive rubber layer 8 is disposed between the surface fastener 10 and the tire inner surface S; the surface fastener 10 is provided with the sheet-shaped substrate 11, the plurality of engaging elements 12 formed on the one surface of this substrate 11, and the plurality of anchor elements 13 formed on the other surface of this substrate 11; and the anchor element 13 digs into the adhesive layer 8. To realize such a configuration, it is sufficient to dispose the adhesive rubber layer 8 between the surface fastener 10 and the inner surface of the carcass molded body T1 and cause the anchor element 13 of the surface fastener 10 to dig into the adhesive rubber layer 8. In this situation, the surface fastener 10 can be fixed firmly on the tire inner surface S.

Figure 11A:
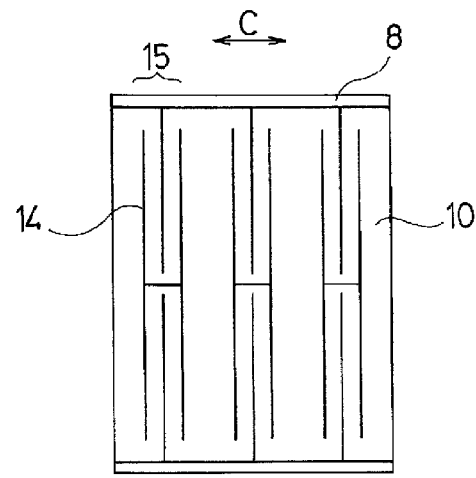
FIGS. 11A to 11C illustrate a surface fastener and an adhesive rubber layer in the manufacturing method of a pneumatic tire according to the present technology.
Figure 11B:
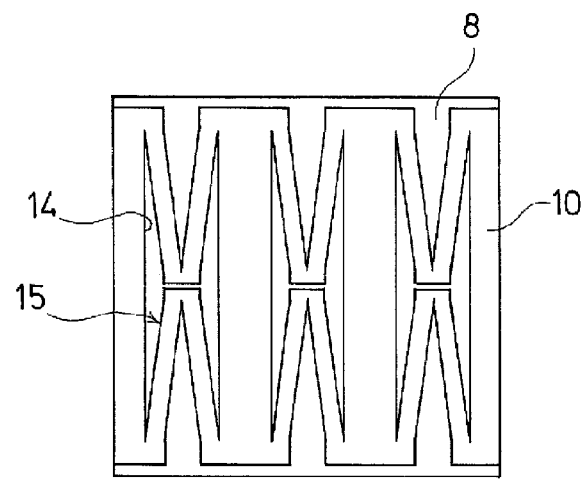
Figure 11C:
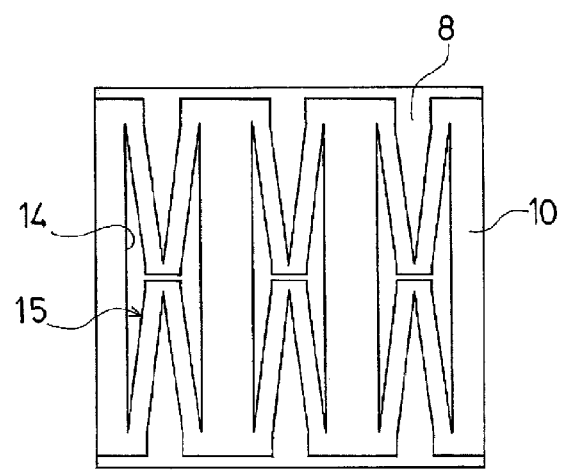

FIGS. 11A to 11C illustrate a method for manufacturing the pneumatic tire of the present technology. In the pneumatic tire above, in disposing the adhesive rubber layer 8 between the surface fastener 10 and the tire inner surface S, it is preferable to provide the cut portion 15 in the surface fastener 10 and have the adhesive rubber layer 8 extend continuously in the tire circumferential direction without being cut off at the cut portion 15. To realize such a configuration, in the manufacturing method of a pneumatic tire of the present technology, it is sufficient to stack the surface fastener 10 without the cut portion 15 and the adhesive rubber layer 8; as illustrated in FIG. 11A, form the cut portion 15 by cutting only the surface fastener 10 stacked with the adhesive layer 8; and dispose the surface fastener 10 formed with the cut portion 15 on the inner surface of the carcass molded body T1 together with the adhesive rubber layer 8. In this situation, an integrity of the adhesive rubber layer 8 can be ensured and a shape stability as a member of the adhesive rubber layer 8 before being wrapped around the molding drum D can be ensured. As illustrated in FIG. 11B, when the surface fastener 10 is stretched, the adhesive rubber layer 8 enters a state of extending continuously in the tire circumferential direction without being cut off at the cut portion 15. Moreover, as illustrated in FIG. 11C, the adhesive rubber layer 8 maintains the state of being continuous in the tire circumferential direction even after vulcanization.

Figure 12A:
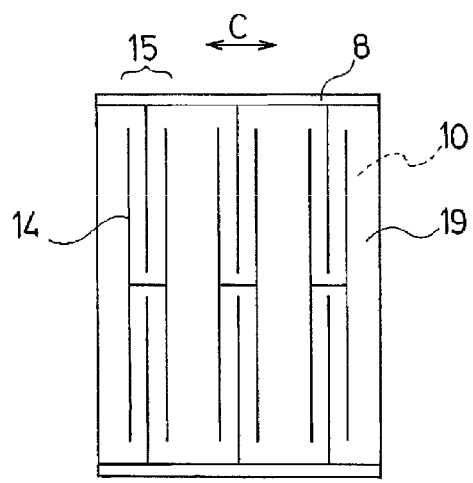
FIGS. 12A to 12C illustrate a surface fastener, an element protection member, and an adhesive rubber layer in the manufacturing method of a pneumatic tire according to the present technology.
Figure 12B:
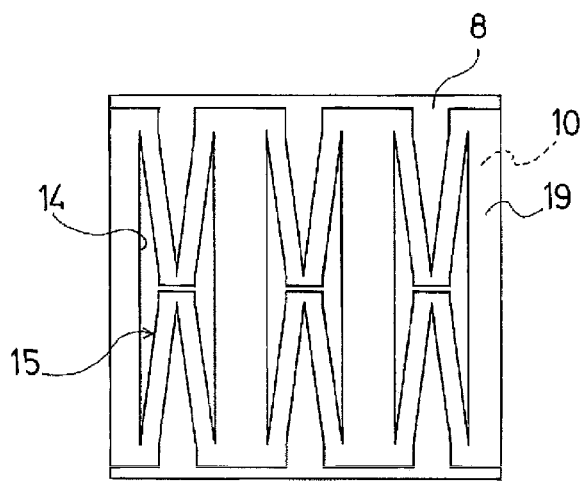
Figure 12C:
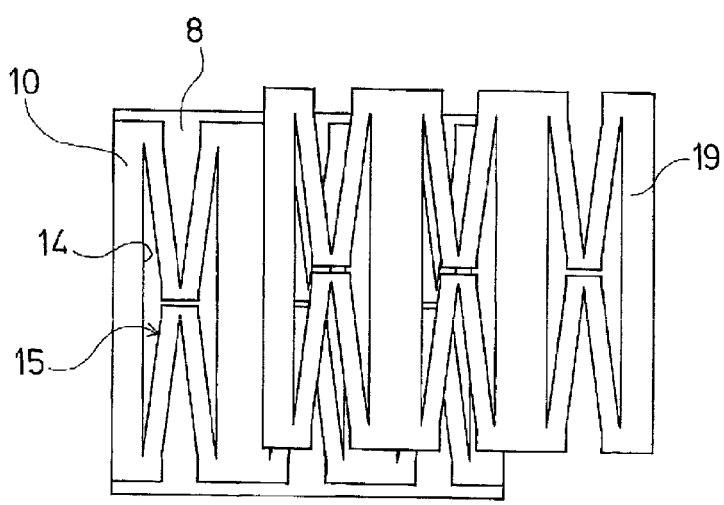

FIGS. 12A to 12C illustrate a method for manufacturing the pneumatic tire of the present technology. In the manufacturing method of a pneumatic tire of the present technology, it is sufficient to engage the surface fastener 10 without the cut portion 15 and an element protection member 19 to each other; stack the surface fastener 10 and the adhesive rubber layer 8 as necessary; as illustrated in FIG. 12A, form the cut portion 15 by simultaneously cutting the surface fastener 10 without the cut portion 15 and the element protection member 19; and dispose the surface fastener 10 formed with the cut portion 15 on the inner surface of the carcass molded body T1 together with the element protection member 19. As the element protection member 19, for example, another surface fastener forming a pair with the surface fastener 10 can be used.

When the green tire T is molded using the carcass molded body T1 provided with such a surface fastener 10 and element protection member 19, as illustrated in FIG. 12B, when the surface fastener 10 stretches, the element protection member 19 also stretches in the tire circumferential direction. Moreover as illustrated in FIG. 12C, the element protection member 19 is peeled off from the surface fastener 10 upon vulcanizing the green tire T. In this situation, the surface fastener 10 can be protected by the element protection member 19 during the vulcanization process. That is, the engaging element 12 of the surface fastener 10 can be prevented from being crushed during the vulcanization process. Moreover, because the element protection member 19 comes to have a structure of being linked continuously similarly to the surface fastener 10, a peeling operation of the element protection member 19 can be performed easily.

EXAMPLES

In manufacturing a pneumatic tire of a tire size of 215/60R16 where the surface fastener is disposed in a region corresponding to a tread portion on a tire inner surface and this surface fastener is vulcanized and adhered on the tire inner surface, tires of Examples 1 to 5 where the structure of the surface fastener is made to differ are fabricated.

More specifically, the cut portion composed of the group of the plurality of notches extending in the width direction of this surface fastener without traversing this surface fastener is formed in the band-shaped surface fastener repetitively along the longitudinal direction of the surface fastener, the surface fastener is divided into the plurality of components by these notches, the surface fastener is disposed on the inner surface of the cylindrical carcass molded body so the longitudinal direction of the surface fastener extends in the tire circumferential direction, the green tire is molded by inflating this carcass molded body into the toroidal shape and bonding the carcass molded body on the inner peripheral surface of the tread ring, the surface fastener is placed in the state where the cut portion is stretched so the components of the surface fastener are continuous in the tire circumferential direction during this molding process of the green tire, and then the green tire is vulcanized. At this time, as the structure of the surface fastener, FIGS. 5A and 5B (Example 1), FIGS. 7A and 7B (Example 2), FIGS. 8A and 8B (Example 3), FIGS. 9A and 9B (Example 4), and FIGS. 10A and 10B (Example 5) are adopted.

Furthermore, for comparison, a tire of a conventional example is fabricated by the same method as Examples 1 to 5 other than disposing a large number of surface fasteners on the inner surface of the cylindrical carcass molded body at intervals along the tire circumferential direction.

As a result, in Examples 1 to 5, the surface fastener was able to be mounted on the tire inner surface during the tire molding process without having the surface fastener fall off. Meanwhile, in the conventional example, a portion of the surface fasteners was lifted from the tire inner surface in the course of inflating the carcass molded body to vulcanizing the green tire and this lifted surface fastener fell off from the tire inner surface.

The invention claimed is:

1. A pneumatic tire, wherein
a band-shaped surface fastener extending in a tire circumferential direction is mounted on a tire inner surface;
a cut portion composed of a group of a plurality of notches extending in a width direction of the surface fastener without traversing the surface fastener is formed in the surface fastener repetitively along the tire circumferential direction;
the surface fastener is divided into a plurality of components by the notches;
the surface fastener is provided with a sheet-shaped substrate and a plurality of engaging elements formed on one surface of the substrate; and
the surface fastener is disposed on the tire inner surface in a state where the cut portion is stretched so the components are continuous in the tire circumferential direction;
wherein a length of each notch in the state where the cut portion is stretched is no less than 20% of a width of the surface fastener; and
wherein a stretched length of the band-shaped surface fastener in the tire circumferential direction is from 105% to 190% of a pre-stretched length of the band-shaped surface fastener in the tire circumferential direction.

2. The pneumatic tire according to claim 1, wherein a period in the tire circumferential direction of the cut portion in the state where the cut portion is stretched is 15% to 150% of a width of the surface fastener.

3. The pneumatic tire according to claim 1, wherein an area of a region surrounded by an outline of the surface fastener in the state where the cut portion is stretched is 105% to 190% of an actual area of the surface fastener.

4. The pneumatic tire according to claim 1, wherein the components of the surface fastener include a plurality of first components configuring a main locking portion without deforming when the cut portion is stretched and a plurality of second components that deforms when the cut portion is stretched and links the first components to each other.

5. The pneumatic tire according to claim 4, wherein a width of the first component is greater than a width of the second component.

6. The pneumatic tire according to claim 1, wherein an adhesive rubber layer is disposed between the surface fastener and the tire inner surface; a plurality of anchor elements are formed on another surface of the substrate; and the anchor elements is made to dig into the adhesive rubber layer.

7. The pneumatic tire according to claim 1, wherein an adhesive rubber layer is disposed between the surface fastener and the tire inner surface, the cut portion is provided in the fastener, and the adhesive rubber layer extends continuously in the tire circumferential direction without being cut off at the cut portion.

8. A manufacturing method of a pneumatic tire, comprising the steps of:

forming, in a band-shaped surface fastener, a cut portion repetitively along a longitudinal direction thereof composed of a group of a plurality of notches extending in a width direction of the surface fastener without traversing the surface fastener;

dividing the surface fastener into a plurality of components by the notches;

disposing the surface fastener on an inner surface of a cylindrical carcass molded body so the longitudinal direction of the surface fastener extends in a tire circumferential direction;

molding a green tire by inflating the carcass molded body into a toroidal shape and bonding this the carcass molded body on an inner peripheral surface of a tread ring;

placing the surface fastener in a state where the cut portion is stretched so the components are continuous in the tire circumferential direction during the molding process of the green tire; and then vulcanizing the green tire;

wherein a length of each notch in the state where the cut portion is stretched is no less than 20% of a width of the surface fastener; and wherein a stretched length of the band-shaped surface fastener in the tire circumferential direction is from 105% to 190% of a pre-stretched length of the band-shaped surface fastener in the tire circumferential direction.

9. The manufacturing method of a pneumatic tire according to claim 8, wherein a period in the tire circumferential direction of the cut portion in the state where the cut portion is stretched is 15% to 150% of a width of the surface fastener.

10. The manufacturing method of a pneumatic tire according to claim 8, wherein an area of a region surrounded by an outline of the surface fastener in the state where the cut portion is stretched is 105% to 190% of an actual area of the surface fastener.

11. The manufacturing method of a pneumatic tire according to claim 8, wherein the components of the surface fastener include a plurality of first components configuring a main locking portion without deforming when the cut portion is stretched and a plurality of second components that deforms when the cut portion is stretched and links the first components to each other.

12. The manufacturing method of a pneumatic tire according to claim 11, wherein a width of the first component is greater than a width of the second component.

13. The manufacturing method of a pneumatic tire according to claim 8, wherein an adhesive rubber layer is disposed between the surface fastener and the inner surface of the carcass molded body; the surface fastener is provided with a sheet-shaped substrate, a plurality of engaging elements formed on one surface of the substrate, and a plurality of anchor elements formed on another surface of the substrate; and the anchor elements is made to dig into the adhesive rubber layer.

14. The manufacturing method of a pneumatic tire according to claim 8, wherein a surface fastener without the cut portion and an adhesive rubber layer are stacked, the cut portion is formed by cutting only the surface fastener stacked with the adhesive rubber layer, and the surface fastener formed with the cut portion is disposed on the inner surface of the carcass molded body together with the adhesive rubber layer.

15. The manufacturing method of a pneumatic tire according to claim 8, wherein the surface fastener without the cut portion and an element protection member are engaged with each other, the cut portion is formed by simultaneously cutting the surface fastener without the cut portion and the element protection member, the green tire is molded by disposing the surface fastener formed with the cut portion on the inner surface of the carcass molded body together with the element protection member, and the element protection member is peeled off from the surface fastener after vulcanizing the green tire.

16. A band-shaped surface fastener mounted on a tire inner surface to extend in a tire circumferential direction that is provided with a cut portion repetitively along the tire circumferential direction composed of a group of a plurality of notches formed to extend in a width direction of the surface fastener without traversing the surface fastener, comprising a plurality of components divided by the notches, and is used in a state where the cut portion is stretched so these components are continuous in the tire circumferential direction;

wherein the components include a plurality of first components configuring a main locking portion without deforming when the cut portion is stretched and a plurality of second components that deforms when the cut portion is stretched and links the first components to each other.

17. The surface fastener according to claim 16, wherein a width of the first component is greater than a width of the second component.

* * * * *